United States Patent
Knutson

(10) Patent No.: US 6,557,100 B1
(45) Date of Patent: Apr. 29, 2003

(54) FASTPATH REDEPLOYMENT OF EJBS

(75) Inventor: James Irwin Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,369

(22) Filed: Oct. 21, 1999

(51) Int. Cl.[7] .................................................. G06F 9/00
(52) U.S. Cl. ...................... 713/100; 707/203; 707/201; 717/118
(58) Field of Search .................... 713/1; 707/1, 200, 707/103 R, 103 Y, 103, 203, 201; 717/118

(56) References Cited

U.S. PATENT DOCUMENTS

| | | | | |
|---|---|---|---|---|
| 5,204,960 A | * | 4/1993 | Smith et al. | 717/111 |
| 5,319,784 A | * | 6/1994 | Parikh | 717/158 |
| 5,615,362 A | * | 3/1997 | Jensen et al. | 707/103 R |
| 5,727,203 A | * | 3/1998 | Hapner et al. | 707/103 R |
| 5,826,253 A | * | 10/1998 | Bredenberg | 707/1 |
| 5,857,197 A | * | 1/1999 | Mullins | 707/102 |
| 5,911,071 A | | 6/1999 | Jordan | 717/408 |
| 6,009,440 A | * | 12/1999 | Watson et al. | 707/200 |
| 6,321,326 B1 | * | 11/2001 | Zollinger et al. | 707/1 |
| 6,324,685 B1 | * | 11/2001 | Balassanian | 717/118 |

* cited by examiner

Primary Examiner—Thomas Lee
Assistant Examiner—Yasin Barqadle
(74) Attorney, Agent, or Firm—David A. Mims, Jr.; Bracewell & Patterson, L.L.P.

(57) ABSTRACT

A system, method, and software program for a fastpath redeployment of an Enterprise Java Bean (EJB). When an EJB is deployed, a copy of it is cached on the server. Thereafter, if the EJB is redeployed, it is compared to the cached copy to determine if the deployment descriptors or remote interfaces have changed. If there has been no change, then the previously deployed EJB is installed on the server, without the need to regenerate and recompile the EJB code.

21 Claims, 8 Drawing Sheets

FASTPATH REDEPLOYMENT OF EJBS

BACKGROUND OF THE INVENTION

1. Technical Field

The present invention generally relates to distributed data processing systems and in particular to server programming in distributed data processing systems. Still more particularly, the present invention relates to improved techniques for repeated deployment of pre-developed program applications to distributed data processing systems.

2. Description of the Related Art

Java™ (a trademark of Sun Microsystems, Inc. of San Jose, Calif.) is a software development language that enables programmers to create program applications and small programs called applets. A virtual machine is generated by Java™ that provides a control interface allowing a Java™ program to overlay and operate on virtually any operating system.

Java™ (Java) was developed with distributed computing, low to no administration and platform independence in mind. The Java™ platform for enterprise-capable Java™ computing utilizes Enterprise JavaBeans™ (trademark of Sun Microsystems) (EJBean) technology that provides for the development and deployment of reusable server components. EJBean server components are individual specialized applications that run in an application server. Traditionally, in a client/server application, the client contains control logic for manipulating a database management system on the server.

EJBeans are designed to support high scalability using a multitier distributed application architecture (architecture that has multiple application components) and the multitier orientation provides many advantages over traditional client/server architectures. EJBean components contain no system level programming, include only business related logic and are fully portable across any EJBean compliant server and any Operating System (OS). Some advantages to EJBean components include reusability, performance, scalability, wire protocol neutral architecture and manageability among others.

Locating logic, for manipulating data, on one or more servers allows an application to operate in multi-processing and multi-threaded systems. Server components can be replicated and distributed across multiple systems enabling multi-tier systems with a scalability of essentially no limit. With a multi-tier environment, reliability is high and manageability is easier because most of the application logic is on the server.

A server component is a reusable software application that performs specific functions and is accessible to any other application through the server component's interface. A server component can be developed for one application and reused in another application that may use the function. Basically, server components are basic building blocks that have specific, published functions that may be combined with other components and applications into a configuration that performs a task designed by a developer.

Traditionally, a Java Virtual Machine (JVM) allows a Java application to run on any operating system, but server side components require proprietary programming interfaces based on vendor software and hardware. EJBean server components are portable and virtually vendor-independent on all Java EJBean compliant application servers. With server component portability, increased scalability, reliability and re-usability, EJBean components can be moved from one execution environment to another without requiring any recoding. Determining whether a new component is valid is a problem that accompanies portability and reusability of EJBean components. EJBean components are required to implement a specific set of interfaces with the container that encloses the beans so the container can manage and control the bean. If the component has a purported function and is moved from one execution environment to another, the component should be validated before being deployed throughout the system served by the EJBean compliant server.

Deploying an EJB involves introspecting classes, reading serialized deployment data, generating code, compiling the generated code and packaging it all up for installation. This can take a significant amount of time to complete, particularly if the platform uses C++ as part of the generated code. The largest portion of time is spent compiling the generated code and can take hours to complete depending on the speed of the host, the amount of code being generated, and the language being used.

The amount of time spent waiting for deployment to complete can significantly reduce productivity during the edit, compile, debug loop phase of development. Therefore, it would be desirable to provide a means to significantly reduce the redeployment time spent during this phase.

SUMMARY OF THE INVENTION

It is therefore one object of the present invention to provide an improved distributed data processing system.

It is another object of the present invention to provide improved server programming in distributed data processing systems.

It is yet another object of the present invention to provide improved techniques for repeated deployment of pre-developed program applications to distributed data processing systems.

The foregoing objects are achieved as is now described. There is provided a system, method, and software program for a fastpath redeployment of an Enterprise Java Bean (EJB). When an EJB is deployed, a copy of it is cached on the server. Thereafter, if the EJB is redeployed, it is compared to the cached copy to determine if the deployment descriptors or remote interfaces have changed. If there has been no change, then the previously deployed EJB is installed on the server, without the need to regenerate and recompile the EJB code.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
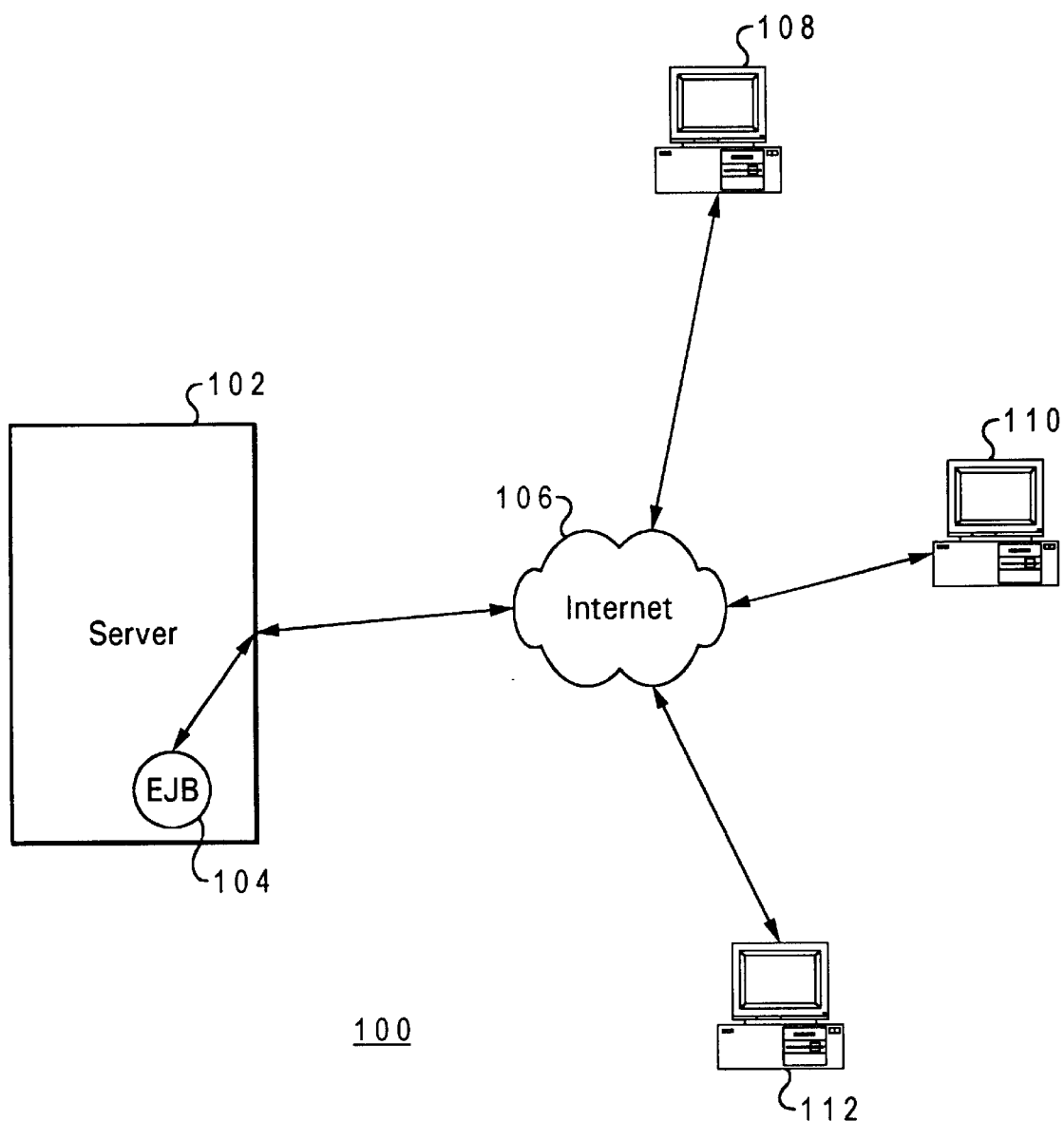
FIG. 1A depicts a distributed computing system in accordance with a preferred embodiment of the present invention.

With reference now to the figures, and in particular with reference to FIG. 1, a distributed computing system in accordance with a preferred embodiment of the present invention, is depicted. System 100 includes server 102, Enterprise Java Bean 104 (EJBean), Internet 106 and separate systems 108 through 112. On server 102, multiple EJBean 104 components may exist at any one time, providing various business related functions. Server 102 must be Enterprise Java Bean compliant and must supply a standard set of services to support EJBean 104 components. Additionally, server 102 must provide a container for the EJBean 104 component which implements control and management for classes of the EJBean 104. Since EJBean 104 components do not require a specific container system, virtually any application server can be adapted to support EJBean 104 components, by adding support for the service defined in the EJB specification.

In the present invention, Internet 106 provides the connection between systems 108–112 and systems 108–112 represent Local Area Networks (LAN), standalone computers, Wide Area Networks (WAN), any data processing system that may connect with server 102 through Internet 106. Multiple systems may connect at the same time with EJBean 104, via home and remote interfaces, utilizing Internet 106 browser clients. Each Enterprise Java Bean is stored in a logical container (see FIG. 1B) and any number of EJBean 104 classes can be present in a single container. A container may not necessarily be present in a single server location and the EJB container could be replicated and distributed across many systems. EJBean 104 may be transient or persistent. A transient bean is termed a "session" bean and a persistent bean is termed an "entity" bean. Session beans are temporary and usually exist only for a single client/server session.

Figure 1B:
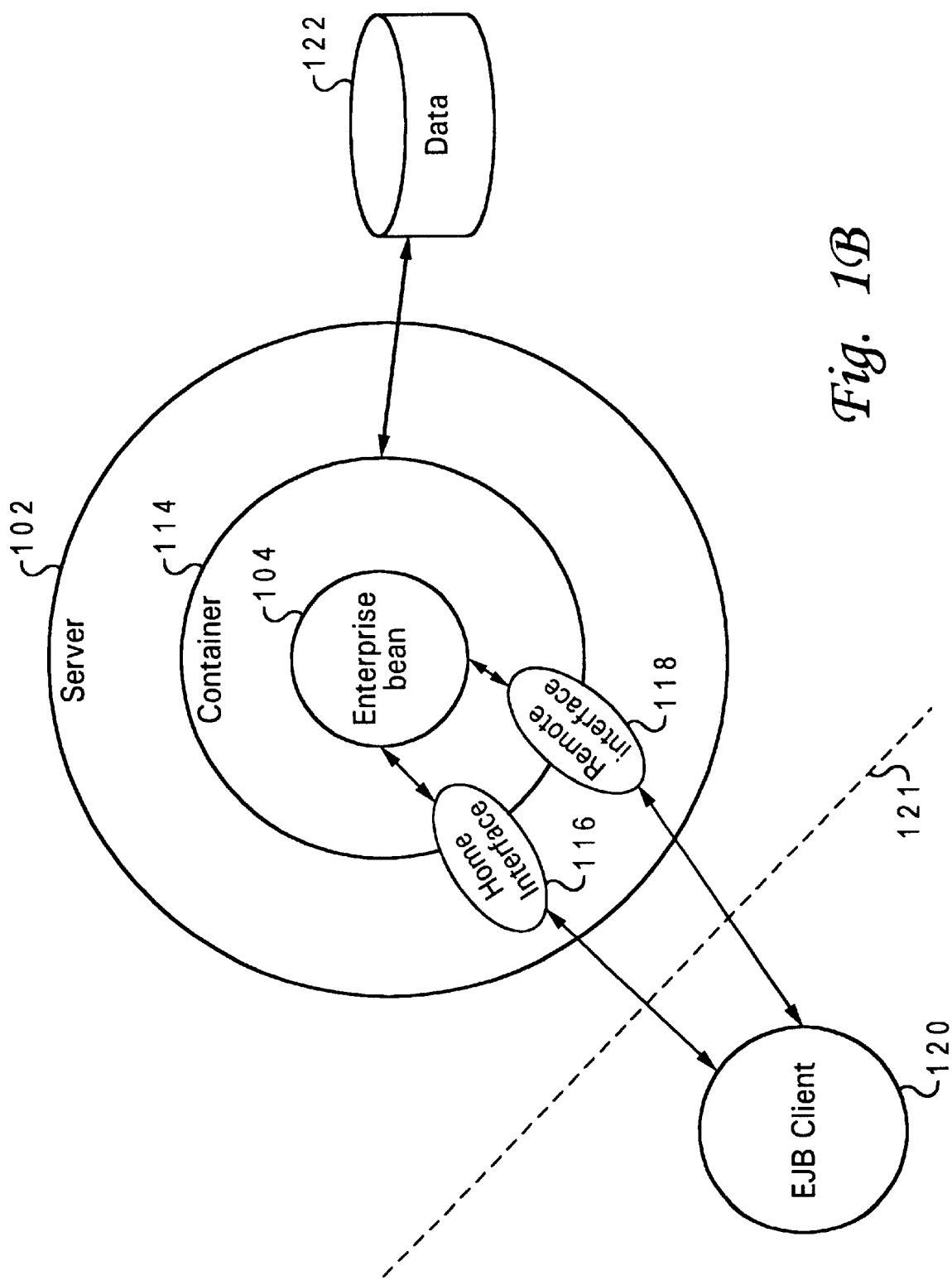
FIG. 1B is a high-level block diagram of operation of an Enterprise Java bean in accordance with the present invention.

Referring to FIG. 1B, a high-level block diagram of operation of an Enterprise Java bean in accordance with the present invention, is illustrated. Client 120 is a Java compliant program originating on a data processing system that is typically remote from the server. Container 114 is the interface between server 102 and EJBean 104. When EJBean 104 is to be deployed (accessed by client 120), deployment tools produce implementations of the home interface 116 and remote interface 118 specific to the container and server. Remote interface 118 provides access, by client 120, to business methods within EJBean 104. Home interface 116 identifies EJBean 104 class and is utilized to create, find and remove EJBean 104 instances. Essentially, container 114 acts as a filter and provides rules concerning transactions, state, security, etc., on all operations. Additionally, container 114 provides an interface with data sources 122, external to the container, that EJBean 104 utilizes during transactions.

Figure 2:
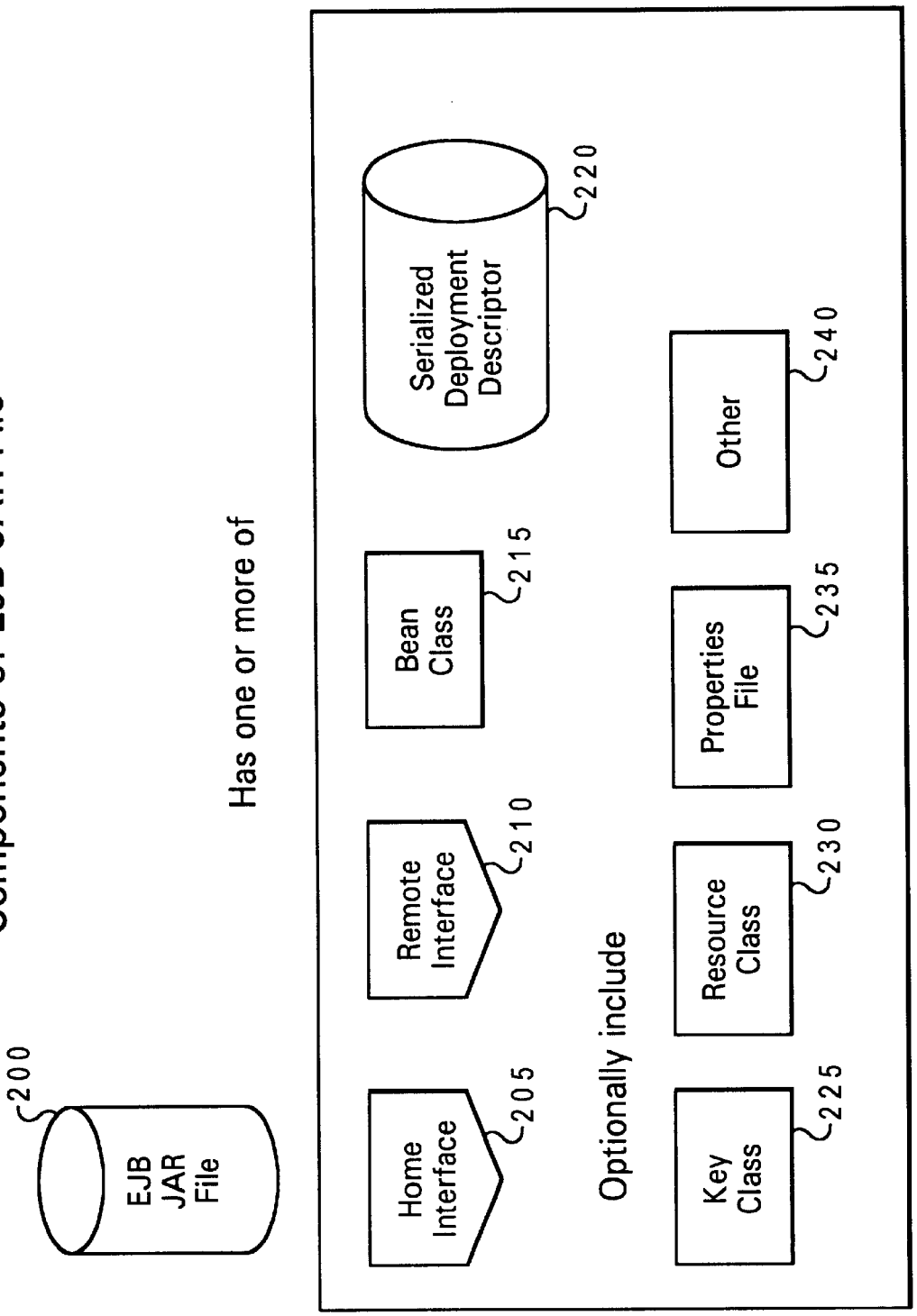
FIG. 2 is a block diagram depicting the components of an EJB JAR file in accordance with the present invention.

FIG. 2 shows a block diagram of the components of an EJB JAR file 200. An EJB JAR file must always contain one or more of: a Home Interface 205, a Remote Interface 210, the Bean Class 215, and the Serialized Deployment Descriptor 220. The EJB JAR file may optionally include the Key Class 225, the Resource Class 230, the Properties File 235, and other customized classes, descriptors, etc. 240.

Figure 3:
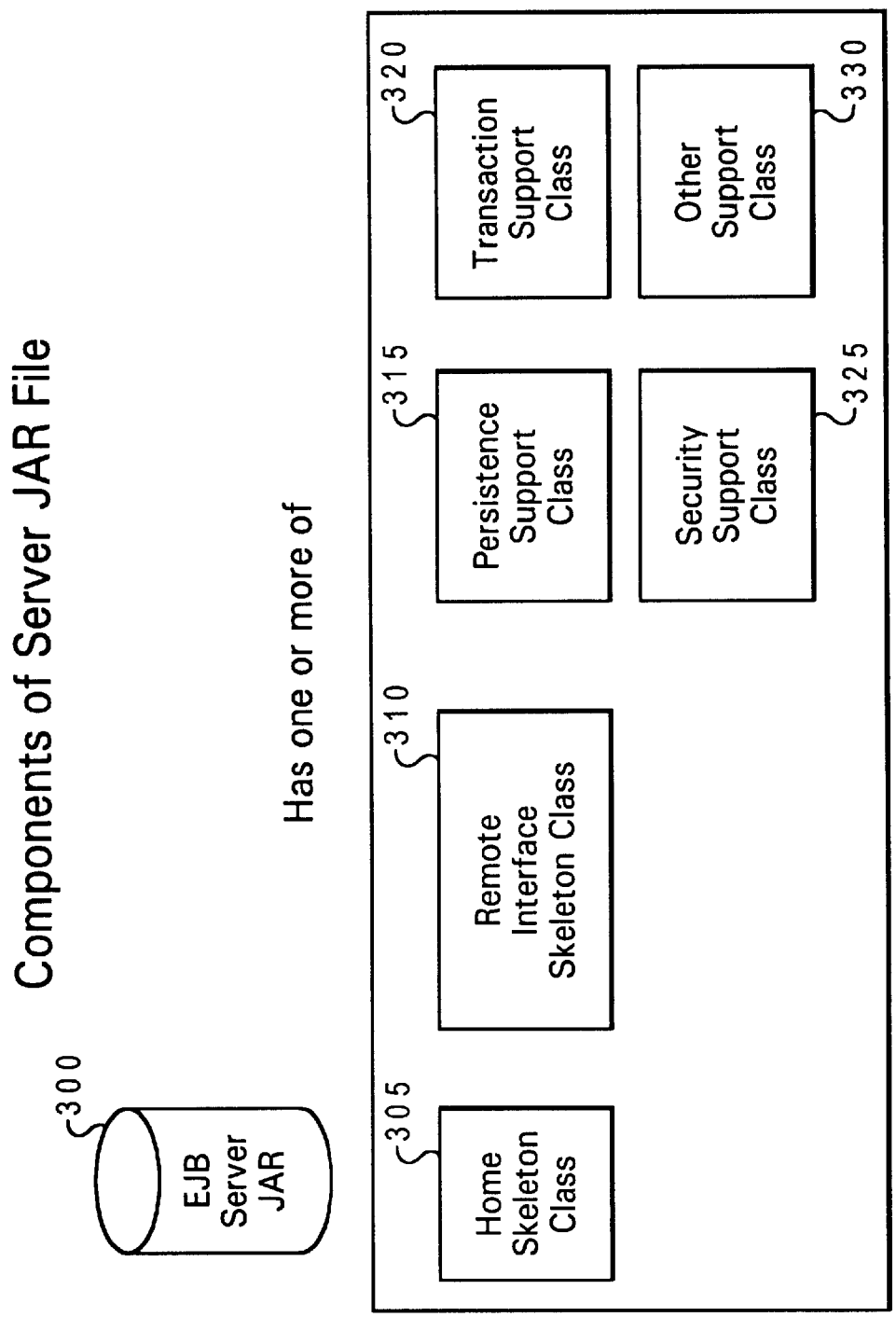
FIG. 3 is a block diagram depicting the components of an EJB Server JAR file in accordance with the present invention.
Figure 4:
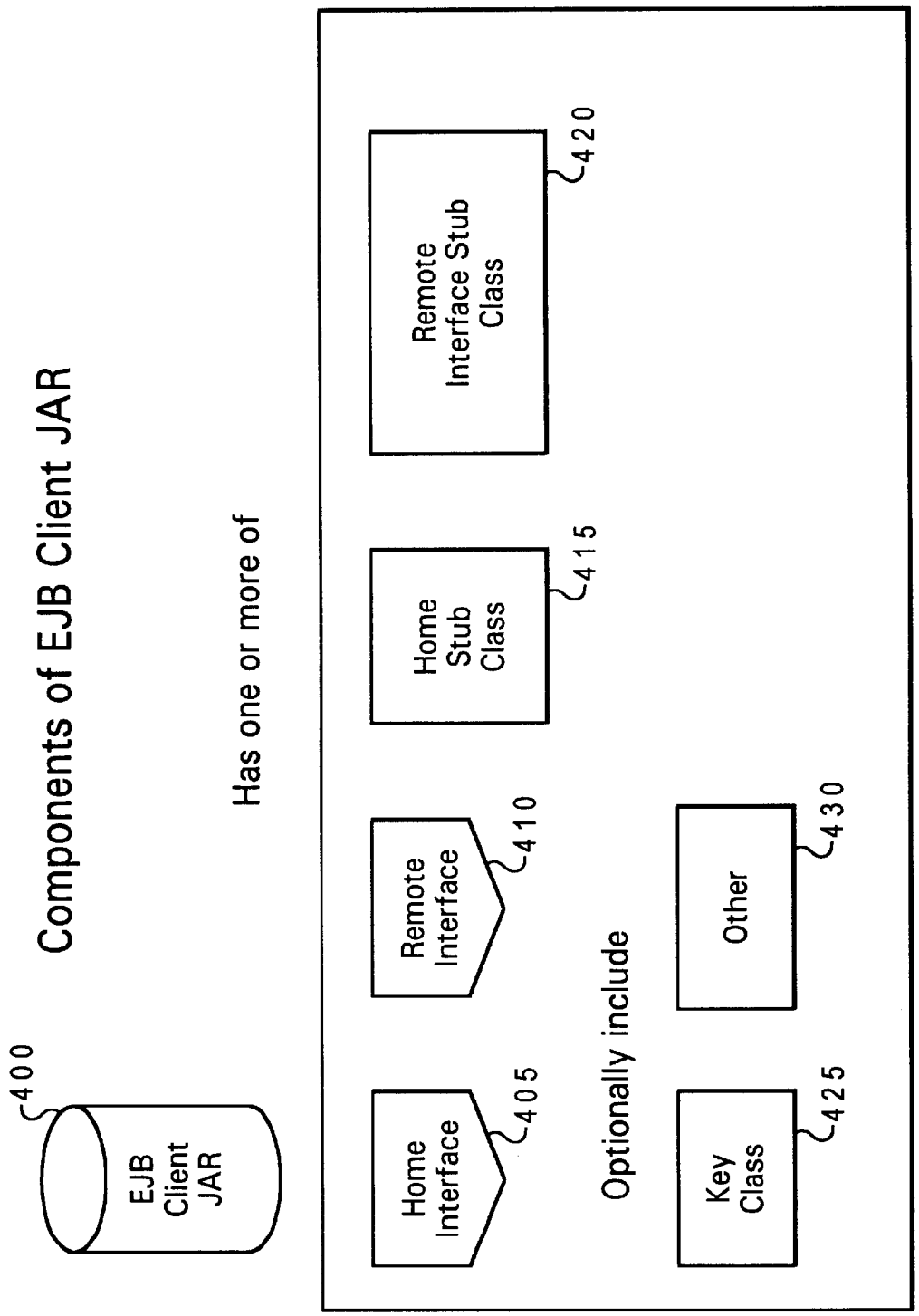
FIG. 4 is a block diagram depicting the components of an EJB Client JAR file in accordance with the present invention.

As shown in FIG. 3, the EJB Server JAR 300 is structured differently. The EJB Server JAR will have one or more of: a Home Skeleton Class 305, a Remote Interface Skeleton Class 310, a Persistence Support Class 315, a Transaction Support Class 320, a Security Support Class 325, and other support classes 330. This may be contrasted with the components of an EJB Client JAR 400, as shown in FIG. 4. The EJB Client JAR has one or more of: a Home Interface 405, a Remote Interface 410, a Home Stub Class 415, and a Remote Interface Stub Class 420. The EJB Client JAR may also optionally include a Key Class 425 and other classes, descriptors, etc. 430.

Figure 5:
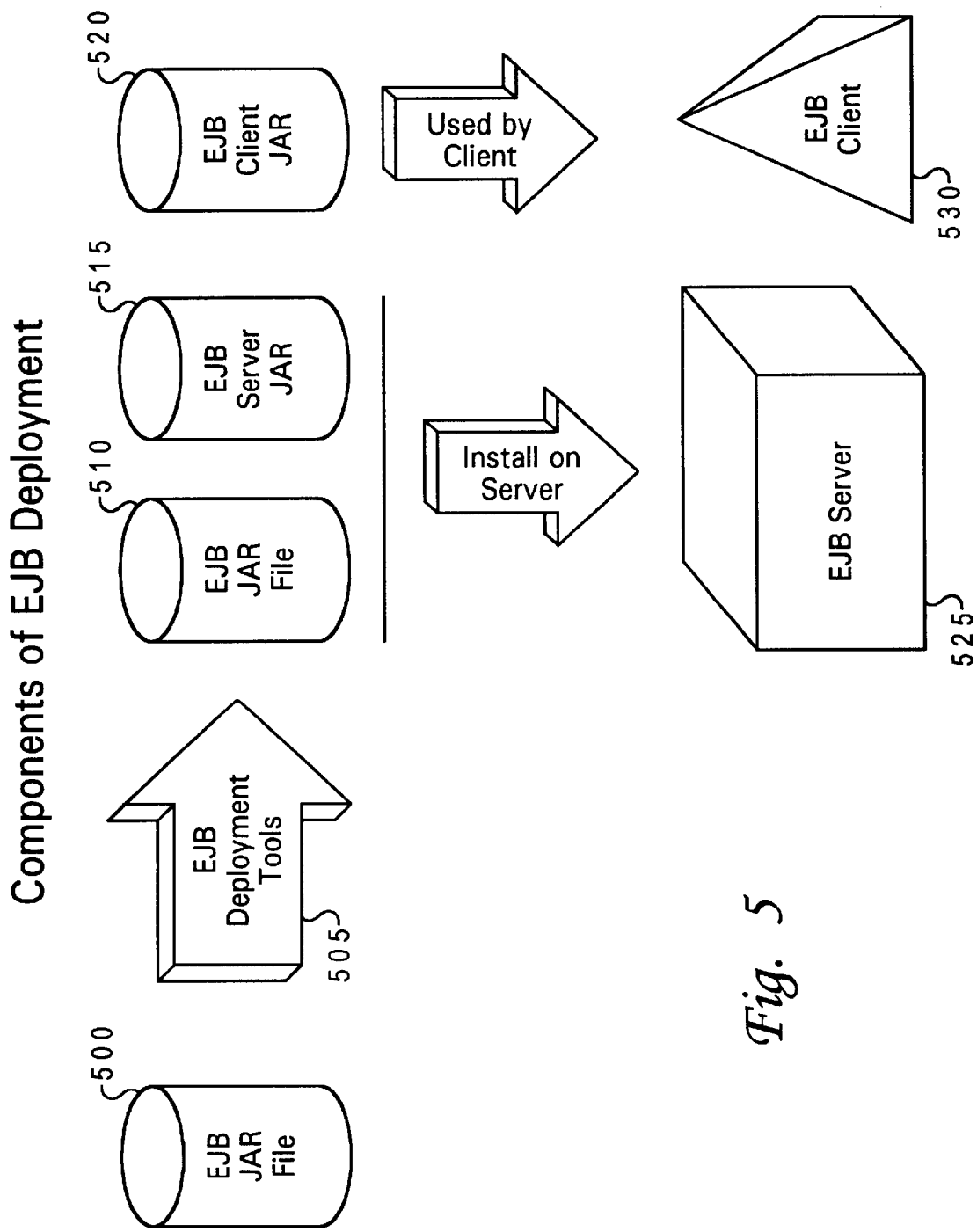
FIG. 5 is a block diagram depicting the components of an EJB deployment in a accordance with the present invention.

FIG. 5 depicts a block diagram of the components of an EJB deployment. In this figure, the original EJB JAR file 500 is processed by the EJB Deployment Tools 505. This process produces the EJB Server JAR 515 and the EJB Client JAR 520. The EJB JAR File 510 (which is the EJB JAR file 500, but is redrawn to show where it is installed) and the EJB Server JAR 515 are then installed on the EJB Server 525. The EJB Client JAR is installed on the EJB Client 530.

This preferred method makes the most significant improvement in the deployment cycle when the application/EJB design is done up front and interfaces (both the home and remote interface) do not change, as will be seen in the discussion below of FIG. 7. When this is the case, then most of the activity in the edit, compile, debug loop is changing the business logic associated with the enterprise bean. It is not necessary to regenerate IDL, stubs, skeletons, container management code, etc. if this is true. By caching a copy of the previously-deployed EJB, and skipping the code-generation and compilation steps, the EJB can be deployed much more quickly and efficiently.

Enterprise JavaBeans Deployment

Enterprise JavaBeans components can be packaged as individual enterprise beans, as a collection of enterprise beans, or as a complete application system. Enterprise JavaBeans components are distributed in a Java Archive File called an EJB-JAR file. The EJB-JAR file contains a manifest file outlining the contents of the file, plus the enterprise bean class files and the Deployment Descriptor objects.

The Deployment Descriptor objects are used to establish the runtime service settings for an enterprise bean. These settings tell the EJB container how to manage and control the enterprise bean. The settings can be set at application assembly or application deployment time.

The DeploymentDescriptor object specifies how to create and maintain an Enterprise Bean object. This object defines, among other things, the enterprise bean class name, the JNDI namespace that represents the container, the Home interface name, the Remote interface name, and the Environment Properties. The DeploymentDescriptor object contains an array of ControlDescriptor objects, which specify the transaction semantics that should be applied to the enterprise bean, and an array of AccessControlEntry objects, which specify the security rules that should be applied to the enterprise bean.

Session beans and entity beans have slightly different requirements; therefore, there are two different types of deployment descriptors.

The SessionDescriptor object extends the DeploymentDescriptor object and adds attributes to indicate whether or not a session bean is stateless or stateful.

The EntityDescriptor object extends the DeploymentDescriptor object and adds attributes to indicate which fields within the object should be persisted automatically by the container.

Figure 6:
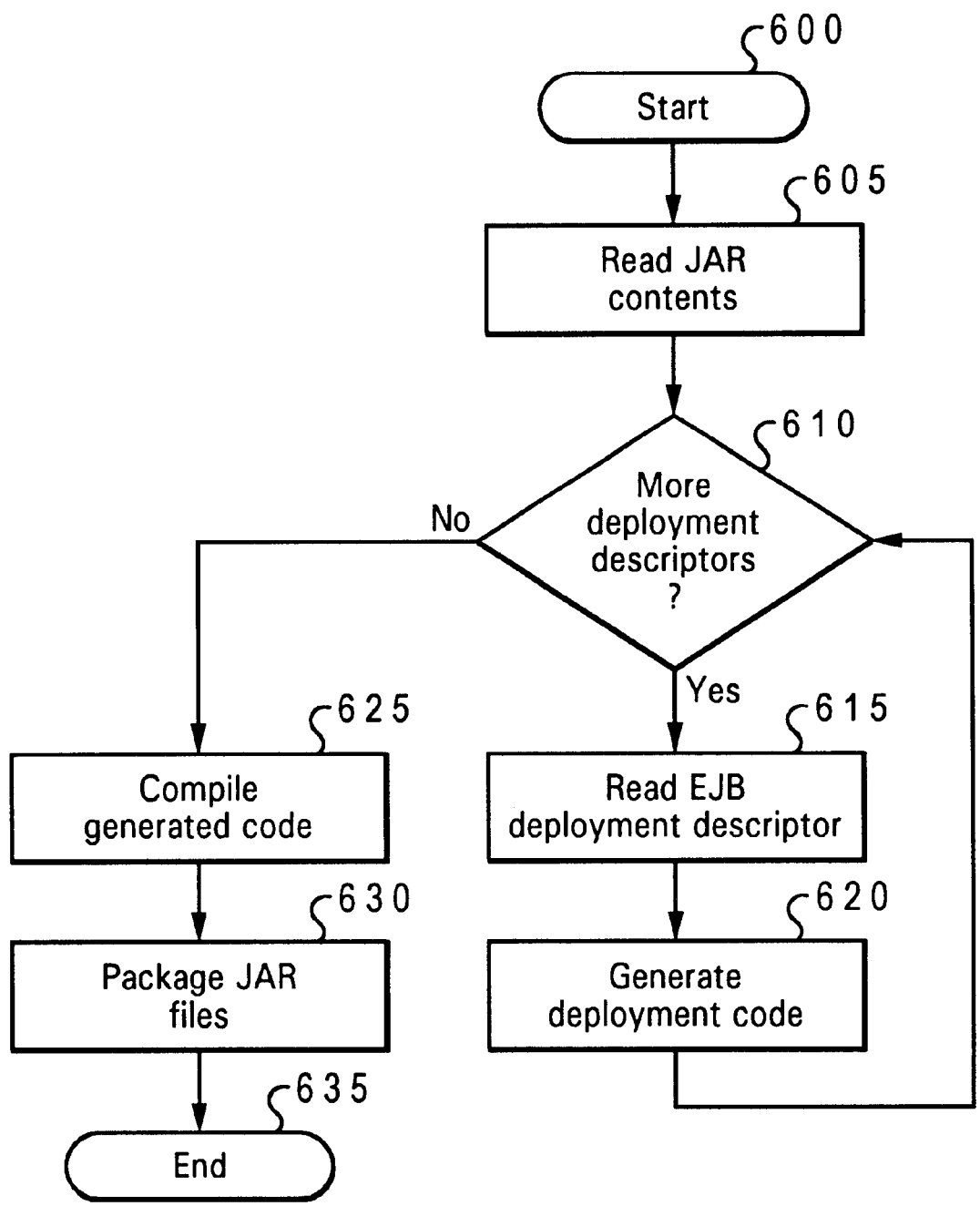
FIG. 6 depicts a flowchart of a conventional EJB deployment process.

FIG. 6 shows a flowchart of some steps of a conventional deployment process. As shown in this figure, after the process starts (step 600), the contents of the existing JAR file is read (step 605). As long as there are unprocessed deployment descriptors associated with this file (step 610), those descriptors must be processed in turn. Each EJB deployment descriptor is read (step 615), then the corresponding deployment code is generated (step 620).

When all the deployment descriptors have been read and the deployment code generated (step 610), the generated code is compiled (step 625). The code is packaged into the JAR files (step 630), as described above, and the process ends (step 635). The JAR files will then be deployed to the server and client as described above.

According to the preferred embodiment, during deployment, a copy of the EJB-JAR or EJB being deployed is first saved for future use. This can either be the JAR content itself or data which represents the EJB.

When the EJB is to be deployed again, the remote interface, home interface, and deployment descriptor information are compared between the previously deployed version and the version being deployed. If all three are the same, then the only possibility of change is in the enterprise bean itself (the business logic). In this case, only the business logic is updated with the new version of the enterprise bean. Packaging of the code then continues on as with the normal deployment case.

Redeployment can further be optimized by assuming that generated code is packaged separately from the EJB-JAR that is being deployed. In this case (assuming the above is also true during redeployment), there is no need at all to perform any compilation. The only thing that needs to be done is to replace the EJB-JAR contents on the server on which it is installed.

Figure 7:
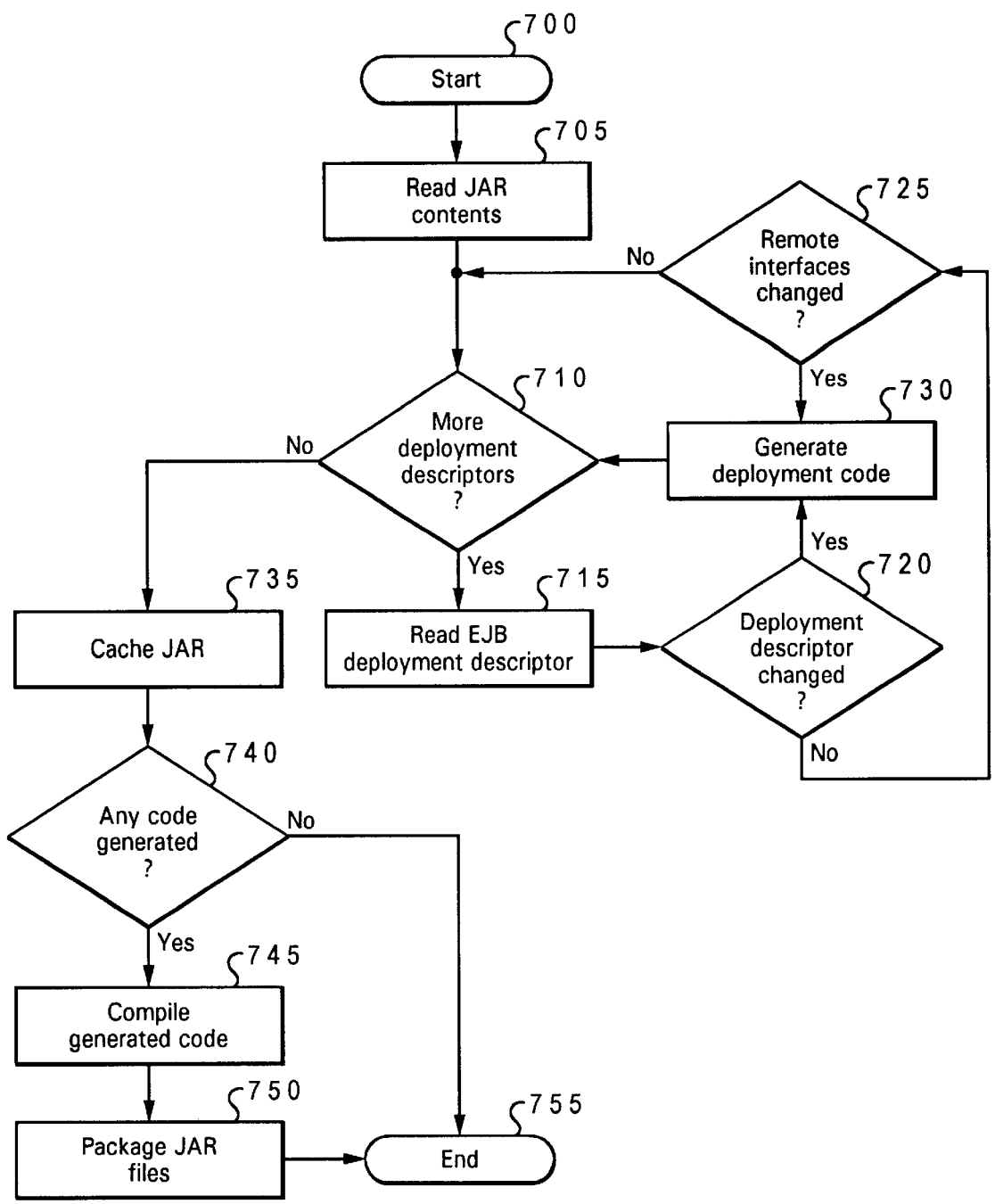
FIG. 7 is a flowchart of an EJB deployment process in accordance with the present invention.

A flowchart of a process according to the preferred embodiment is shown in FIG. 7. In this flowchart, it is assumed that a copy of the previously-deployed JAR file has been cached. As in the conventional case, when the process is started (step 700), the JAR contents are read (step 705). Then, as long as there are unprocessed deployment descriptors (step 710), each deployment descriptor is read and processed in turn (step 715). First, the deployment descriptor is compared to the deployment descriptor in the cached JAR to determine if it has changed (step 720). If it has, the corresponding deployment code is generated (step 730) and the process looks for the next deployment descriptor (step 710).

If the deployment descriptor was not changed (step 720), however, the interfaces, shown as remote interface 118 and home interface 116 in FIG. 1B, are compared against the cached JAR to see if they have changed (step 725). If not, then the process looks for the next deployment descriptor (step 710). If the remote interfaces have changed, the deployment code for that descriptor is generated (step 730), and the process moves to the next descriptor (step 710).

When all the deployment descriptors have been processed (step 710), the JAR is cached (step 735). The process then checks to see if any new code was generated (step 740). If there is newly generated code, then the code is compiled (step 745) and packaged into JAR files (step 750) as in the conventional process. The process then ends (step 755). If, however, no new code was generated (step 735), then, according to the preferred method, no recompilation and repackaging is necessary, and the process simply ends (step 755).

In the context of this flowchart, it can be easily seen that a considerable amount of code generation, code compilation, and packaging time can be eliminated when the remote interfaces and deployment descriptors have not changed. This is a great improvement over conventional processes, in which all the code is compiled and packaged into JAR files every time the EJB is deployed.

The preferred process eliminates code generation and compilation of nearly a hundred files in typical cases of deployed EJBs. Typical redeployment times are reduced from roughly 10 minutes per EJB for pure Java deployment and 30+ minutes for C++, to nearly instant. The edit-compile-debug cycle time is drastically reduced and productivity is increased.

It is important to note that while the preferred invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for deploying a server-side object on a distributed computer system, comprising the steps of:
   comparing the server-side object to a previously deployed object;
   if a set of deployment attributes of the previously deployed object is the same as a set of deployment attributes of the server-side object, then
      deploying the server-side object using compiled code associated with the previously deployed object; and
   if the set of deployment attributes of the previously deployed object is not the same as the set of deployment attributes of the server-side object, then
      generating deployment code according to the set of deployment attributes of the server-side object,
      compiling the deployment code to produce a compiled deployment code, and
      deploying the server-side object using the compiled deployment code.

2. The method of claim 1, wherein the set of deployment attributes includes deployment descriptors.

3. The method of claim 1, wherein the set of deployment attributes includes remote interfaces.

4. The method of claim 1, wherein the server-side object is an Enterprise Java Bean.

5. The method of claim 1, wherein the previously deployed object is an Enterprise Java Bean.

6. The method of claim 1, wherein the server-side object is deployed on a network server.

7. The method of claim 1, wherein the server-side object is stored in an Enterprise Java Bean Java Archive file (EJB JAR file), said EJB JAR file including a home interface, a remote interface and a bean class.

8. A computer program product for deploying a server-side object on a distributed computer system, comprising, on a computer-useable medium:
   instructions for comparing the server-side object to a previously deployed object;
   instructions for deploying the server-side object using compiled code associated with the previously deployed object if a set of deployment attributes of the previously deployed object is the same as a set of deployment attributes of the server-side object; and
   instructions for generating deployment code according to the set of deployment attributes of the server-side object, compiling the deployment code to produce a compiled deployment code, and deploying the server-side object using the compiled deployment code, if the set of deployment attributes of the previously deployed object is not the same as the set of deployment attributes of the server-side object.

9. The computer program product of claim 8, wherein the set of deployment attributes includes deployment descriptors.

10. The computer program product of claim 8, wherein the set of deployment attributes includes remote interfaces.

11. The computer program product of claim 8, wherein the server-side object is an Enterprise Java Bean.

12. The computer program product of claim 8, wherein the previously deployed object is an Enterprise Java Bean.

13. The computer program product of claim 8, wherein the server-side object is deployed on a network server.

14. The computer program product of claim 8, wherein the server-side object is stored in an Enterprise Java Bean Java Archive file (EJB JAR file), said EJB JAR file including a home interface, a remote interface and a bean class.

15. An apparatus for deploying a server-side object comprising:
   a network;
   a data processing system connected to said network;
   a server for receiving said server-side object, connected to said data processing system;
   an archive file containing said server-side object, wherein said archive file includes a set of deployment attributes;
   a stored archive file containing a deployed server object, wherein said stored archive file includes a set of stored deployment attributes;
   wherein the server-side object is compared to the deployed server-side object, and
   if the set of stored deployment attributes is the same as the set of deployment attributes, then the server-side object is deployed using compiled code associated with the deployed server object; and
   if the set of stored deployment attributes is not the same as the set of deployment attributes, then the server-side object is deployed using code generated and compiled according to the set of deployment attributes.

16. The apparatus of claim 15, wherein the set of deployment attributes includes deployment descriptors.

17. The apparatus of claim 15, wherein the set of deployment attributes includes remote interfaces.

18. The apparatus of claim 15, wherein the server-side object is an Enterprise Java Bean.

19. The apparatus of claim 15, where in the previously deployed server-side object is an Enterprise Java Bean.

20. The apparatus of claim 15, wherein the server-side object is deployed on a network server.

21. The apparatus of claim 15, wherein the server-side object is stored in an Enterprise Java Bean Java Archive file (EJB JAR file), said EJB JAR file including a home interface, a remote interface and a bean class.

* * * * *